July 4, 1961  W. COHEN  2,990,684
ROD ASSEMBLED PLASTIC ROCKET
Filed Feb. 10, 1958
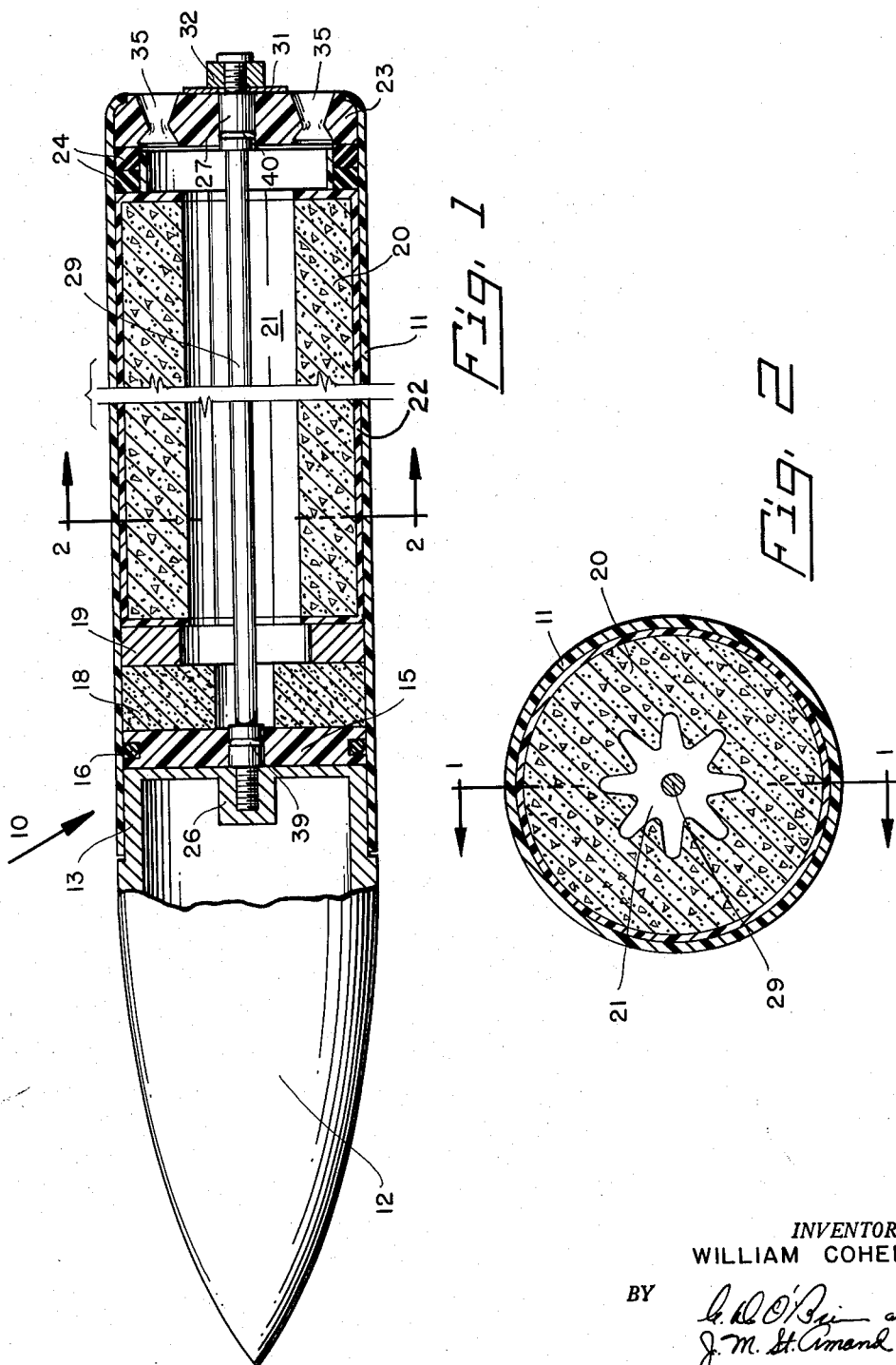
INVENTOR.
WILLIAM COHEN United States Patent Office
2,990,684
Patented July 4, 1961

2,990,684
ROD ASSEMBLED PLASTIC ROCKET
William Cohen, Falls Church, Va., assignor to the United States of America as represented by the Secretary of the Navy
Filed Feb. 10, 1958, Ser. No. 714,445
5 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to rockets and more particularly to a rod-assembled plastic rocket.

In the present invention the rocket consists of a rocket motor wherein the head closure plate, the motor tube, and the nozzle plate are constructed from plastic materials. Furthermore, the rocket motor elements are held together in aligned position by means of a single securing rod which permits the use of lightweight plastic materials, and appropriate sealing rings are used to prevent leakage of combustion gases. Previous methods of assembling non-metallic rockets have involved adhesive joints, lock-wires, or threads, all of which required good axial and shear strength. In this invention, a longitudinal rod of high-strength metal is used to bear the axial force generated by the internal pressure, thereby eliminating the difficulties associated with the joining of components of non-metallic rockets, since no plastic part is required to bear axial stress or shear stress.

An object of the invention, therefore, is to provide a rocket motor assembled by means of a single metallic rod.

Another object of the invention is to provide a non-metallic rocket motor.

A further object of the invention is to provide a plastic rocket in which no plastic part is required to bear axial stress or shear stress.

Other objects and many of the attendant advantages of this invention will be readily appreciated as the same become better understood by reference to the following detailed description when considered in connection with the accompanying drawings wherein:

FIG. 1 is a cross-sectional side view of a rocket of the present invention; and

FIG. 2 is a cross-sectional view taken along the line 2—2 of FIG. 1.

Referring to FIGS. 1 and 2 of the accompanying drawing, the rocket projectile 10 includes a motor tube 11, of plastic or other suitable material, having a given inner diameter, and a forward end member 12, such as a warhead, that has a reduced skirt 13 which fits snugly within the forward end of said motor tube 11. An annular motor tube head closure plate 15, also of plastic, fits within the forward end motor tube 11 and bears against the end of end member 12. Sealing ring 16 seals head closure plate 15 with motor tube 11 against leakage of combustion gases. An igniter assembly 18, of annular configuration, bears against the rearward surface of closure plate 15. Against igniter 18, is placed an annular shaped vibration damper 19. A grain 20 of solid propellant material having a central axial hollow core 21 and an inhibitor coating 22 about the external surface thereof, fits within plastic tube 11 and bears against vibration damper 19. Propellant grain 20 extends almost to the rearward end of motor tube 11. Nozzle plate 23 extends through the rearward end of motor tube 11 and bears against the rearward surface of propellant grain 20 through annular sealing rings 24.

The forward end member 12 of projectile 10 has a central attaching means 26 and nozzle plate 23 has a central longitudinal aperture 27. A securing rod 29 extends through aperture 27, through hollow core 21 and the other aligned openings in the annular parts of the projectile, and is connected with connecting means 26 in forward end member 12 by means of screw threads, as illustrated, or any other suitable means. Securing rod 29 is provided with means, such as washer 31 and nut 32 which screws on end 33 of the rod, to bear against the rear surface of nozzle plate 23, when tightened, so that the assembled parts of projectile 10 are rigidly held together without the application of stresses to motor tube 11.

Nozzle plate 23 is provided with suitable nozzle openings 35 for exhausting combustion gases. Securing rod 29 may be coated with a ballistic modifier material, for flame inhibiting, to combine the securement function of the rod with a flame inhibiting function; also sealing rings 39 and 40 may be provided at opposite ends of rod 29.

The rocket motor of the present invention is freed from axial stress and shear stress by use of tie-rod 29, and the motor tube 11 is required to withstand only the circumferential hoop-stress produced by the axial pressure. Therefore, the plastic motor tube 12 can be made having exceptional hoop-strength properties and minimum axial strength.

The preferred modification of the present invention, as illustrated, contains a single central tie-rod; this tie-rod may be sheathed in a protective tube of plastic or in a propellant if desirable. Furthermore, as modifications, multiple small-diameter rods may be located internally or externally of the rocket motor in place of the single central tie-rod, as may be desirable.

Obviously, many modifications and variations of the present invention are possible in the light of the above teachings. It is therefore to be understood that within the scope of the appended claims the invention may be practiced otherwise than as specifically described.

What is claimed is:

1. A rocket motor comprising a motor tube, a forward end member having a cylindrical reduced skirt which slideably fits within the bore of said motor tube, an annular head closure plate in the forward end of said motor tube bearing against said forward end member, an annular igniter assembly in said motor tube bearing against the rearward surface of said closure plate, an annular vibration damping means bearing against the rearward surface of said igniter assembly, an annular grain of solid propellant material with a coating of inhibiting material thereabout having an outer diameter equal to the inner diameter of said motor tube bearing against the rearward surface of said vibration damping means and of a length to extend almost to the rearward end of said motor tube, annular sealing means bearing against the rearward surface of the grain, and a nozzle plate having a plurality of angularly spaced nozzles extending therethrough bearing against the rearward surface of said sealing means, said forward member having a central attaching means and said nozzle plate having a central longitudinal aperture, a securing rod extending through said nozzle plate aperture and through the aligned openings in the annular parts and being connected to said central attaching means in said forward end member, said securing rod having means bearing against a rearward surface of said nozzle plate and being operable to rigidly hold together the assembled parts without the application of stresses to said motor tube.

2. A rocket motor as in claim 1 wherein the motor tube, the head closure plate and the nozzle plate are all of plastic material, and said securing rod is metal.

3. A rocket motor as in claim 1 wherein said securing rod is coated with a ballistic modifier material to combine the securement function with a flame inhibiting function.

4. A rocket motor as in claim 1 wherein said securing rod is sheathed in a protective coating of plastic.

5. A rocket motor as in claim 1 wherein said securing rod is sheathed in a coating of propellant.

References Cited in the file of this patent

UNITED STATES PATENTS

| | | |
|---|---|---|
| 2,112,758 | Blacker | Mar. 29, 1938 |
| 2,446,560 | Skinner | Aug. 10, 1948 |
| 2,490,349 | Golden | Dec. 6, 1949 |
| 2,685,837 | Sage et al. | Aug. 10, 1954 |
| 2,697,325 | Spaulding | Dec. 21, 1954 |
| 2,712,283 | Golden | July 5, 1955 |
| 2,781,633 | Rogers et al. | Feb. 19, 1957 |
| 2,816,418 | Loedding | Dec. 17, 1957 |
| 2,820,410 | Tarr | Jan. 21, 1958 |
| 2,853,946 | Loedding | Sept. 30, 1958 |